US012583058B2

(12) United States Patent
Petot et al.

(10) Patent No.: US 12,583,058 B2
(45) Date of Patent: Mar. 24, 2026

(54) SURFACE MODIFICATION OF WELDING WIRE DRIVE ROLLS

(71) Applicant: Lincoln Global, Inc., Santa Fe Springs, CA (US)

(72) Inventors: Bradford W. Petot, South Euclid, OH (US); Matthew A. Albright, Thomson, OH (US); Steven R. Peters, Huntsburg, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 1451 days.

(21) Appl. No.: 16/987,537

(22) Filed: Aug. 7, 2020

(65) Prior Publication Data

US 2021/0078109 A1     Mar. 18, 2021

Related U.S. Application Data

(60) Provisional application No. 62/902,085, filed on Sep. 18, 2019.

(51) Int. Cl.
B23K 26/352       (2014.01)
B23K 9/133         (2006.01)
(Continued)

(52) U.S. Cl.
CPC .......... B23K 26/355 (2018.08); B23K 9/1336 (2013.01); B23K 26/0622 (2015.10); B23K 2101/20 (2018.08)

(58) Field of Classification Search
CPC ............... B23K 26/355; B23K 9/1336; B23K 26/0622; B23K 2101/20; B23K 26/3584;
(Continued)

(56) References Cited

U.S. PATENT DOCUMENTS 3,167,636 A     1/1965   Bosteels
3,694,620 A     9/1972   Gleason
(Continued)

FOREIGN PATENT DOCUMENTS

CN       102448651 A       5/2012
CN       204339099 U       5/2015
(Continued)

OTHER PUBLICATIONS

Kemppi; "ArcFeed 200, 300, 300P, 300RC Operating Manual"; https://resources.userdoc.kemppi.com/manuals/kemppi-arcfeed-om-en.pdf; Accessed Jul. 5, 2018; pp. 1-20.
(Continued)

*Primary Examiner* — Tiffany T Tran
(74) *Attorney, Agent, or Firm* — Brad C. Spencer

(57)          ABSTRACT

A welding wire drive roll has an outer circumferential surface having a circumferential groove projecting radially inward from the outer circumferential surface. The circumferential groove is formed by a first sidewall having a first sidewall surface, a second sidewall having a second sidewall surface, and a groove base extending between the first sidewall and the second sidewall. The first sidewall surface includes a first surface finishing comprising a first ring of laser-formed craters along the first sidewall surface. The second sidewall surface includes a second surface finishing comprising a second ring of laser-formed craters along the second sidewall surface.

22 Claims, 3 Drawing Sheets

(51) Int. Cl.
    *B23K 26/0622*      (2014.01)
    *B23K 101/20*      (2006.01)

(58) Field of Classification Search
    CPC .............. B23K 26/362; B65H 2701/36; B65H 51/10
    USPC ........................................ 219/121.68, 121.69
    See application file for complete search history.

(56)            References Cited

U.S. PATENT DOCUMENTS

| | | | |
|---|---|---|---|
| 4,200,382 A * | 4/1980 | Friedman ........... | B23K 26/0823 |
| | | | 492/30 |
| 5,816,466 A | 10/1998 | Seufer | |
| 6,066,833 A | 5/2000 | Rigdon et al. | |
| 6,740,417 B1 * | 5/2004 | Sievers ................... | B28D 1/00 |
| | | | 125/1 |
| 8,278,599 B2 | 10/2012 | Patterson | |
| 8,569,653 B2 | 10/2013 | Enyedy | |
| 9,517,524 B2 | 12/2016 | Miller | |
| 9,839,970 B2 | 12/2017 | Peters et al. | |
| 10,010,962 B1 | 7/2018 | Gelmetti et al. | |
| 10,493,508 B2 | 12/2019 | Bassi et al. | |
| 2005/0199673 A1 | 9/2005 | Enyedy | |
| 2007/0137037 A1 | 6/2007 | Noble et al. | |
| 2008/0156783 A1 | 7/2008 | Vanden Heuvel et al. | |
| 2009/0277890 A1 * | 11/2009 | Leiteritz .............. | B23K 9/1336 |
| | | | 82/1.11 |
| 2010/0314373 A1 * | 12/2010 | Patterson ............... | B65H 51/14 |
| | | | 219/136 |
| 2011/0309062 A1 | 12/2011 | O'Donnell et al. | |
| 2013/0292366 A1 | 11/2013 | Enyedy et al. | |
| 2013/0334188 A1 | 12/2013 | Enyedy et al. | |
| 2014/0263212 A1 | 9/2014 | Zhang | |
| 2015/0174699 A1 | 6/2015 | Bruck | |
| 2015/0184555 A1 * | 7/2015 | Lettmann ........... | B23K 26/3584 |
| | | | 123/90.6 |
| 2015/0209848 A1 | 7/2015 | Kopplin et al. | |
| 2015/0209905 A1 | 7/2015 | Matthews et al. | |
| 2016/0121420 A1 | 5/2016 | Denis | |
| 2016/0334001 A1 * | 11/2016 | Zimmer ................. | B23K 26/34 |
| 2018/0043455 A1 | 2/2018 | Vigdal et al. | |
| 2018/0058502 A1 * | 3/2018 | Hosoe ............... | B23K 26/0624 |
| 2019/0022720 A1 | 1/2019 | Shafiei et al. | |

| | | | |
|---|---|---|---|
| 2019/0176198 A1 | 6/2019 | Beier et al. | |
| 2020/0114452 A1 | 4/2020 | Peters et al. | |
| 2020/0398376 A1 * | 12/2020 | Watanabe .......... | B23K 37/0461 |

FOREIGN PATENT DOCUMENTS

| | | |
|---|---|---|
| CN | 105658368 A | 6/2016 |
| DE | 129180 A1 | 1/1978 |
| DE | 44 20 706 A1 | 12/1995 |
| DE | 196 11 597 A1 | 9/1997 |
| DE | 20 2012 100 409 U1 | 5/2013 |
| EP | 2 444 512 A1 | 4/2012 |
| EP | 3 270 016 A1 | 1/2018 |
| JP | S51-44542 A | 4/1976 |
| JP | H02-258168 A | 10/1990 |
| JP | H05-111769 A | 5/1993 |
| JP | H07-1144 A | 1/1995 |
| JP | H0-747474 A | 2/1995 |
| JP | H10-58142 A | 3/1998 |
| JP | H10-113771 A | 5/1998 |
| JP | 3739870 B2 | 1/2006 |
| KR | 200455348 Y1 | 8/2011 |
| WO | 2012/153177 A1 | 11/2012 |

OTHER PUBLICATIONS

Castolin Eutectic; "CastoMIG 350C and DS"; https:/ecitydoc.com/download/strongerwith-castolin-eutectic-welding-equipment catalogue_pdf; Dated Jan. 29, 2018; pp. 1-52.
Misumi; "Guide Roller (V Type, Single Bearing) (GRL-SH1-V)"; https://my.misumi-ec.com/vona2/detail/221000383638/?CategorySpec-00000196577%3a%3ad; Accessed Jul. 5, 2018; pp. 1-5.
EWM AG; "MIG/MAG Primer"; Dated Nov. 2015; p. 94.
Extended European Search Report from Corresponding Application No. 19203369.4; Dated Jul. 31, 2020; pp. 1-8.
Extended European Search Report from Corresponding Application No. EP19203389.2; Dated Jun. 22, 2020; pp. 1-9.
Shi, et al.; "Physical Characteristics of Twin-Wire Indirect Arc Plasma;" Vacuum; vol. 107; Dated Apr. 3, 2014; pp. 41-50.
Extended European Search Report from Corresponding Application No. 19205296.7; Dated Aug. 13, 2020; pp. 1-13.
Extended European Search Report from Corresponding Application No. 19205356.9; Dated Aug. 13, 2020; pp. 1-9.
Extended European Search Report from Corresponding Application No. 20196632.2; Dated Feb. 21, 2021; pp. 1-7.

* cited by examiner

SURFACE MODIFICATION OF WELDING WIRE DRIVE ROLLS

CROSS-REFERENCE TO RELATED APPLICATIONS

The present application claims priority to U.S. Provisional Patent Application Ser. No. 62/902,085 filed Sep. 18, 2019, the disclosure of which is incorporated herein by reference.

BACKGROUND OF THE INVENTION

Field of the Invention

The present invention relates to surface finishing for welding wire drive rolls.

Description of Related Art

Drive rolls for welding wire electrodes have circumferential grooves that are sized for the diameter of the wire to be fed by the drive rolls. The grooves of drive rolls designed to feed solid welding wires typically lack a surface finishing, such as knurling, because solid welding wires can be clamped tightly between the drive rolls without deforming. However, cored welding wires (e.g., flux-cored welding wires and metal-cored welding wires) and solid wires made of a soft metal, such as aluminum and silicon bronze, deform much more easily under high clamping pressure. The high clamping pressure required to reliably drive a typical solid welding wire may be too great for a cored or soft welding wire and can crush the wire. Deforming or crushing the wire can lead to feeding problems and poor performance at the welding arc. Typically, when a cored or soft metallic welding wire is used in a welding process, drive rolls having knurled grooves are used to feed the wire so that the clamping pressure of the drive rolls can be reduced. The knurled surface finishing provides the necessary friction to drive the wire at a lower clamping pressure that does not deform the cylindrical shape or crush the wire. However, the knurling tends to raise burrs on the outer surface of the wire. Burrs are undesirable in that over time they wear out the liner in the welding torch through which the wire is fed. Further, knurling the grooves on a drive roll requires specialized tooling. It would be desirable to add a surface finishing to drive roll grooves that requires less tooling than knurling, is less likely to raise burrs on a driven wire, and that provides suitable friction to drive the wire (e.g., a cored wire or a soft solid wire) at a clamping pressure that does not deform the wire.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding wire drive roll. The welding wire drive roll comprises an outer circumferential surface having a circumferential groove projecting radially inward from the outer circumferential surface. The circumferential groove is formed by a first sidewall having a first sidewall surface, a second sidewall having a second sidewall surface, and a groove base extending between the first sidewall and the second sidewall. The first sidewall surface includes a first surface finishing comprising a first ring of laser-formed craters along the first sidewall surface. The second sidewall surface includes a second surface finishing comprising a second ring of laser-formed craters along the second sidewall surface.

In accordance with another aspect of the present invention, provided is a welding wire drive roll. The welding wire drive roll comprises an outer circumferential surface having a first circumferential groove and a second circumferential groove axially-offset from the first circumferential groove. Both of the first circumferential groove and the second circumferential groove project radially inward from the outer circumferential surface. The first circumferential groove is formed by a first sidewall having a first sidewall surface, a second sidewall having a second sidewall surface, and a first concave groove base extending between the first sidewall and the second sidewall. The first sidewall surface includes a first surface finishing comprising a first plurality of laser-formed craters arrayed annularly along the first sidewall surface and having respective central depressions that are recessed into the first sidewall surface and outer peripheral portions that are raised above the first sidewall surface. The second sidewall surface includes a second surface finishing comprising a second plurality of laser-formed craters arrayed annularly along the second sidewall surface and having respective central depressions that are recessed into the second sidewall surface and outer peripheral portions that are raised above the second sidewall surface. The second circumferential groove is formed by a third sidewall having a third sidewall surface, a fourth sidewall having a fourth sidewall surface, and a second concave groove base extending between the third sidewall and the fourth sidewall. The third sidewall surface includes a third surface finishing comprising a third plurality of laser-formed craters arrayed annularly along the third sidewall surface and having respective central depressions that are recessed into the third sidewall surface and outer peripheral portions that are raised above the third sidewall surface. The fourth sidewall surface includes a fourth surface finishing comprising a fourth plurality of laser-formed craters arrayed annularly along the fourth sidewall surface and having respective central depressions that are recessed into the fourth sidewall surface and outer peripheral portions that are raised above the fourth sidewall surface.

In accordance with another aspect of the present invention, provided is a welding wire drive roll. The welding wire drive roll comprises an outer circumferential surface having a circumferential groove projecting radially inward from the outer circumferential surface. The circumferential groove is formed by a first sidewall, a second sidewall, and a groove base extending between the first sidewall and the second sidewall. At least one of the first sidewall, the second sidewall, and the groove base includes a surface finishing comprising a ring of laser-formed craters along a surface of said at least one of the first sidewall, the second sidewall, and the groove base.

In accordance with another aspect of the present invention, provided is a method of surface finishing a welding wire drive roll. The method includes the step of providing the welding wire drive roll, wherein the welding wire drive roll comprises an outer circumferential surface having a circumferential groove projecting radially inward from the outer circumferential surface, and wherein the circumferential groove is formed by a first sidewall having a first sidewall surface, a second sidewall having a second sidewall surface, and a groove base extending between the first sidewall and the second sidewall. The method further includes the step of rotating the welding wire drive roll while simultaneously irradiating the first sidewall with a pulsed laser beam thereby creating a first ring of craters along the first sidewall surface.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figures 1, 2, 3:
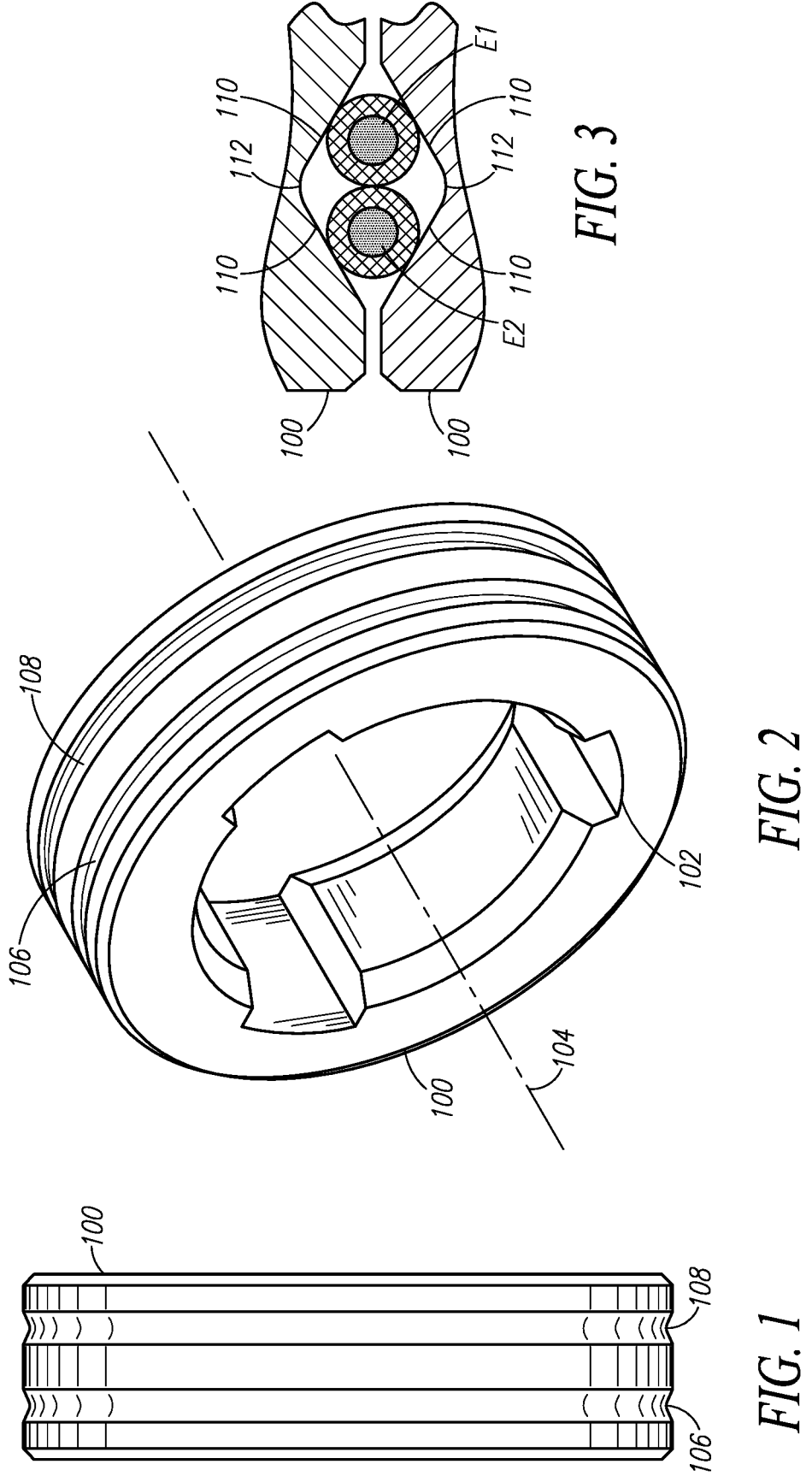
FIG. 1 illustrates an example drive roll.
FIG. 2 is a perspective view of the example drive roll.
FIG. 3 illustrates a cross section of drives rolls feeding dual wires.

The present invention relates to surface finishing for welding wire drive rolls. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of the present invention are described herein in the context of a welding system. Example welding systems include gas metal arc welding (GMAW) systems, submerged arc welding (SAW) systems, flux-cored arc welding (FCAW) systems, metal-cored arc welding (MCAW) systems, and the like. Further, the wires described herein can be solid wires or cored wire, (e.g., flux-cored electrodes and metal-cored electrodes). Embodiments of the present invention can be used in manual, semi-automatic and robotic welding operations. In addition to welding operations, embodiments of the present invention can be used in welding-type processes, such as additive manufacturing and hardfacing processes. The wires described herein can be filler wires used, for example, in gas tungsten arc welding (GTAW), plasma arc welding (PAW), or laser welding. Thus, the term "welding" is to be interpreted to include welding and welding-type processes, and the term "welding wire" is to be interpreted as including wire electrodes and filler wire.

FIGS. 1 and 2 illustrate an example drive roll 100. The drive roll 100 has a central bore. The inner surface of the bore can include contoured recesses 102 for receiving projections on a driving mechanism of a wire feeder, such as a drive gear, to transfer drive torque to the drive roll 100. An axis 104 of the drive roll 100, around which the drive roll 100 would rotate during operation or surface finishing, is shown in FIG. 2. The drive roll 100 includes one or more annular or circumferential wire receiving grooves 106, 108. The circumferential wire receiving grooves 106, 108 are formed on the outer circumferential surface of the drive roll 100 and project radially inward toward the axis 104. The circumferential grooves 106, 108 are spaced axially or are axially-offset along the circumference of the drive roll 100.

In certain embodiments, the circumferential grooves 106, 108 are sized and shaped to receive and drive a single welding wire. In other embodiments, the circumferential grooves 106, 108 are designed and shaped to receive and drive two welding wires simultaneously. The two welding wires driven simultaneously can have the same diameter or different diameters. Example standard welding wire diameters for use with the drive rolls 100 include 0.030 inches, 0.035 inches, 0.040 inches, 0.045 inches, etc. The circumferential grooves 106, 108 can have the same width and depth as each other, or have different widths and depths to accommodate different sizes or combinations of welding wires. If the circumferential grooves 106, 108 each have the same width and depth, then the drive roll 100 can be reused when one groove is worn out by simply flipping the drive roll over and reinstalling it on the wire feeder.

FIG. 3 shows partial cross sections of example drive rolls 100 as they would be mounted on a wire feeder for supplying dual welding wires. The drive rolls 100 are biased together to provide a clamping force on a first E1 and the second E2 welding wire, such as cored welding wires. The welding wires E1, E2 are both located in the annular or circumferential grooves of the upper and lower drive rolls 100. Due to a bias or clamping force applied to the drive rolls 100, the welding wires E1, E2 are clamped in the circumferential grooves against upper and lower sidewalls 110 forming the grooves and the neighboring welding wire. The welding wires E1, E2 are stably held via three points of contact within the circumferential grooves. This clamping system can allow both wires E1, E2 to be fed through a wire feeder and welding torch in a consistent manner. The two welding wires E1, E2 support each other during feeding and pull each other along via friction. Because the inner and outer sidewalls 110 of the circumferential grooves are angled, they apply both vertical and horizontal clamping forces on the welding wires E1, E2. The horizontal clamping force pushes the welding wires E1, E2 together, causing them to contact each other. In certain embodiments, the welding wires E1, E2 are clamped within the circumferential grooves so as to be radially offset from both of the groove bases 112. That is, the welding wires E1, E2 are pinned between each other and the angled sidewalls 110 of the grooves such that gaps exist between the welding wires and the groove bases 112. In FIG. 3, the drive rolls 100 have circumferential grooves with straight, angled sidewalls 110 joined by a concave curved or radiused groove base 112 extending between the sidewalls. In an example embodiment, the angle between the sidewalls 110 and the outer circumferential surface of the drive roll 100 is about 150°, although other angles are possible and can be determined with sound engineering judgment. It is to be appreciated that the sidewalls 110 need not be straight as shown but could have a curved sidewall surface, and the groove base 112 need not be concave as shown but could be straight (e.g., to form a circumferential groove having a trapezoidal shape). The circumferential grooves could have a variety of shapes. For example, if a horizontal clamping force is not needed, the circumferential grooves could have a square, rectangular, or U-shape. Moreover, the shapes of the circumferential grooves in the upper and lower drive rolls shown in FIG. 3 can be different from each other.

Figures 4, 5, 6, 7:
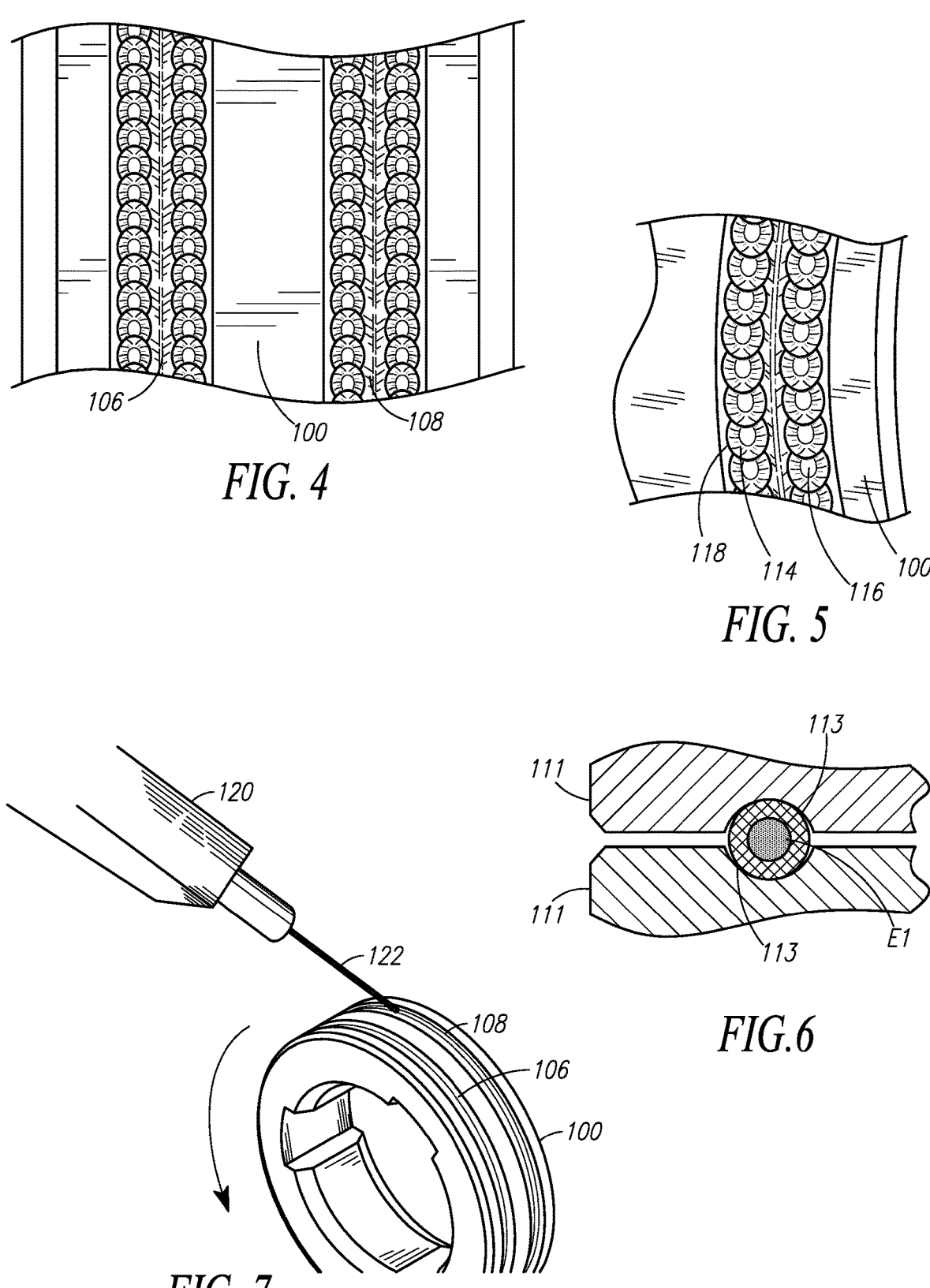
FIG. 4 illustrates a surface finishing on drive roll grooves.
FIG. 5 illustrates the surface finishing on drive roll grooves.
FIG. 6 illustrates a cross section of drives rolls feeding a single wire.
FIG. 7 illustrates a laser surface finishing applied to drive roll grooves.

FIGS. 4 and 5 show an example surface finishing on the circumferential grooves 106, 108. The surface finishing is applied to the surfaces of the sidewalls of the circumferential grooves 106, 108 to increase the friction between the sidewalls and the welding wires, to allow the drive rolls to feed the welding wires without slipping at lower clamping pressures. In the embodiment of FIGS. 4 and 5, the surface finishing is created by pulsed laser etching rather than knurling. Pulsed laser etching results in a surface finishing that is less sharp or duller than knurling and, thus, is less likely to raise burrs on the driven wire, which can wear out a torch liner. Pulse laser etching also requires less tooling than knurling the grooves 106, 108.

To create the surface finishing, a laser is pulsed to irradiate a sidewall of the circumferential groove 106, 108. The laser pulse forms a crater 114 in the sidewall of the groove 106, 108. The laser pulse displaces material from the center of the crater 114 out to the outer peripheral portions of the crater. Each crater 114 has a central depression 116 that is recessed into the sidewall of the groove and a raised peripheral portion 118 that is raised above the sidewall surface. The raised outer peripheral portions 118 of the craters 114 are formed by material displaced from the central depressions 116 of each crater 114. Each laser pulse forms one crater in the sidewall of the groove.

The drive roll 100 can be rotated while the laser is pulsed to create rings of laser-formed craters along the sidewall surfaces of the circumferential grooves. In FIGS. 4 and 5, each groove sidewall has a single ring of laser-formed craters. However, the sidewalls could have more than one ring of laser-formed craters. Each crater 114 of the ring of laser-formed craters in FIGS. 4 and 5 is shown at being located at substantially the same radial distance from the central axis of the drive roll 100 (e.g., each central depression is located at approximately the same radial location along the sidewall of the groove). However, the craters 114 need not be located at the same radial distance from the central axis of the drive roll 100. The craters 114 can be positioned at any location along the sidewall surfaces of the grooves 106, 108 as desired. For example, some craters 114 can be located higher along the groove sidewall surfaces closer to the outer circumferential surface of the drive roll 100, and other craters can be located lower along the groove sidewall surfaces closer to the groove base. The rings of laser-formed craters within a circumferential groove 106, 108 or between different grooves on a drive roll 100 can have substantially the same radial distance from the central axis of the drive roll or have different radial distances. For example, a ring of laser-formed craters on an outer sidewall of a circumferential groove can have a different radial distance and location along the sidewall than a ring of laser-formed craters on the inner sidewall of the groove. The laser surface finishing can also be applied along the groove base if desired. Accordingly, the groove base can include one or more rings of laser-formed craters in addition to craters formed on the sidewalls of the grooves 106, 108. In certain embodiments, such as in drive rolls for single wires that have U-shaped circumferential grooves, laser-formed craters are only provided along the groove base and are not formed along the sidewalls.

In FIGS. 4 and 5, adjacent craters 114 of each ring of laser-formed craters overlap with each other. The diameter of each crater 114 is slightly larger than the spacing between the central depressions 116 of each crater. However, the craters 114 need not overlap and each crater could be spaced apart from each adjacent crater if desired. The size, spacing, number of craters on a groove sidewall, etc., can be determined based on the properties (e.g., compressive strength) of the wire electrode to be driven by the drive rolls and the properties of the drive rolls (e.g., friction provided by the surface finishing of the grooves).

FIG. 6 shows partial cross sections of example drive rolls 111 having U-shaped circumferential grooves 113. The U-shaped grooves 113 receive and drive a single cored welding wire E1 in FIG. 6. The size (e.g., radius) of the two grooves 113 are closely matched to the diameter of the welding wire E1. The central portion or bottom of the circumferential grooves 113 forms the groove base, and the sidewalls of the grooves are concave and extend from the groove base to the outer circumferential surfaces of the drive rolls 113. The groove base and sidewalls can have the same radiuses or have different radiuses. A surface finishing, such as the laser-formed craters discussed above, can be applied to one or more of the groove base and each of the sidewalls. In an example embodiment, a single ring of laser-formed craters is provided along the groove base at the bottom of each groove 113. The craters can overlap as shown in FIGS. 4 and 5 or they can be spaced apart from each other.

FIG. 7 schematically shows a laser etching process applied to the sidewalls of a drive roll 100 circumferential groove 108. The surface finishing of a groove sidewall can be completed in a single revolution of the drive roll 100, or can be completed over several revolutions. Each groove sidewall can receive a single surface finishing (e.g., a single ring of laser-formed craters), or multiple surface finishings (e.g., multiple rings of laser-formed craters). Each groove sidewall can receive a surface finishing by the same laser device 120, or by different laser devices simultaneously. In a certain embodiment, the same laser device 120 provides a surface finishing on all four groove sidewalls of the two circumferential grooves 106, 108 of the drive roll 100 and/or on the groove bases.

During surface finishing, the drive roll 100 is rotated at a given angular velocity while the laser device 120 is pulsed to irradiate portions of the circumferential grooves 106, 108 (e.g., the sidewalls and/or groove bases) with a laser beam 122. The energy of the laser beam pulses create the craters in the surfaces of the circumferential grooves 106, 108. The angular velocity of the drive roll 100 and the pulse frequency of the laser device 120 determines the number of craters in a given ring of craters on the sidewalls of the circumferential grooves 106, 108. The craters along a groove sidewall or groove base can be created during a single revolution of the drive roll 100 or during multiple revolutions of the drive roll. The laser device 120 can maintain a fixed position while surface finishing a groove sidewall or can be moved to create craters at various radial distances along the sidewalls. The laser device 120 need not be pulsed or can be pulsed intermittently during the surface finishing operation to create furrows (e.g., strips, wave shapes, etc.) along the sidewalls or base of the grooves. The size and depth of the craters, furrows, etc. created by the laser device 120 can be controlled or adjusted by regulating the power or energy of the laser beam 122. The laser beam 122 can be oriented perpendicular to the sidewalls or base of the circumferential grooves to create the surface finishing, or at another angle with respect to the sidewalls/base. The angling of the laser pulses with respect to the groove walls can affect the shape of the craters. For example, perpendicular laser pulses can be used to create relatively uniform craters that have outer peripheral portions with a consistent height. Angled pulses can be used to create craters having varying outer peripheral portions with higher and lower spots.

A drive roll 100 having two circumferential grooves 106, 108 and, thus, four sidewalls and/or two groove bases to be surface finished, can be laser etched relatively quickly, such as within several seconds. If multiple laser devices 120 are employed, then the various groove surfaces can be etched simultaneously. Alternatively, a single laser device 120 can sequentially surface finish each sidewall of the grooves 106, 108. The laser device 120 can also surface finish the groove bases if desired by orienting the laser beam 122 downward toward the bottom of the groove.

In an example embodiment, each crater of the surface finishing or ring of craters has a diameter in the range of 0.020-0.050 inches, although other diameters are possible. If it is desired to have adjacent craters overlap, the spacing of adjacent craters can be less than the diameter of the craters. If it is desired that adjacent craters should be spaced apart from each other, then the diameter of the craters should be less than the spacing between adjacent craters. The crater size will be determined by the characteristics of the laser beam 122 (e.g., power and pulse duration), while the spacing between the craters will be determined by the laser pulse frequency and the angular velocity of the drive roll 100 during surface finishing.

In an example embodiment, the drive roll 100 has a diameter of approximately 1¾ inches. The drive roll 100 can be rotated in approximately 3 seconds while pulsing the laser between 20 and 60 Hz to create a ring of laser-formed craters along the sidewalls of the grooves having approximately 60 and 180 craters. This process can be repeated for each sidewall, so that all four sidewalls of the two circumferential grooves are surface-finished within about 12 seconds, which is relatively quick. Of course, other drive roll angular velocities and laser pulse frequencies are possible and are to be considered within the scope of the present invention.

In FIGS. 4 and 5, the craters 114 and each ring of craters are shown as being substantially centered along the sidewall of each circumferential groove 106, 108. However, it is to be appreciated that the craters 114 need not be centered along the sidewalls of the grooves 106, 108 and could be located closer to the outer circumferential surface of the drive roll 100 or closer to the groove base if desired. The crater diameters in FIGS. 4 and 5 are greater than 50% of the width of the sidewalls of the circumferential grooves 106, 108.

However, the craters 114 could have a smaller diameter, such as less than 50% of the width of the sidewalls of the circumferential grooves 106, 108. The diameter of the craters 114 can be controlled by the energy level of the laser pulses applied to the sidewalls of the grooves 106, 108.

Figure 8:
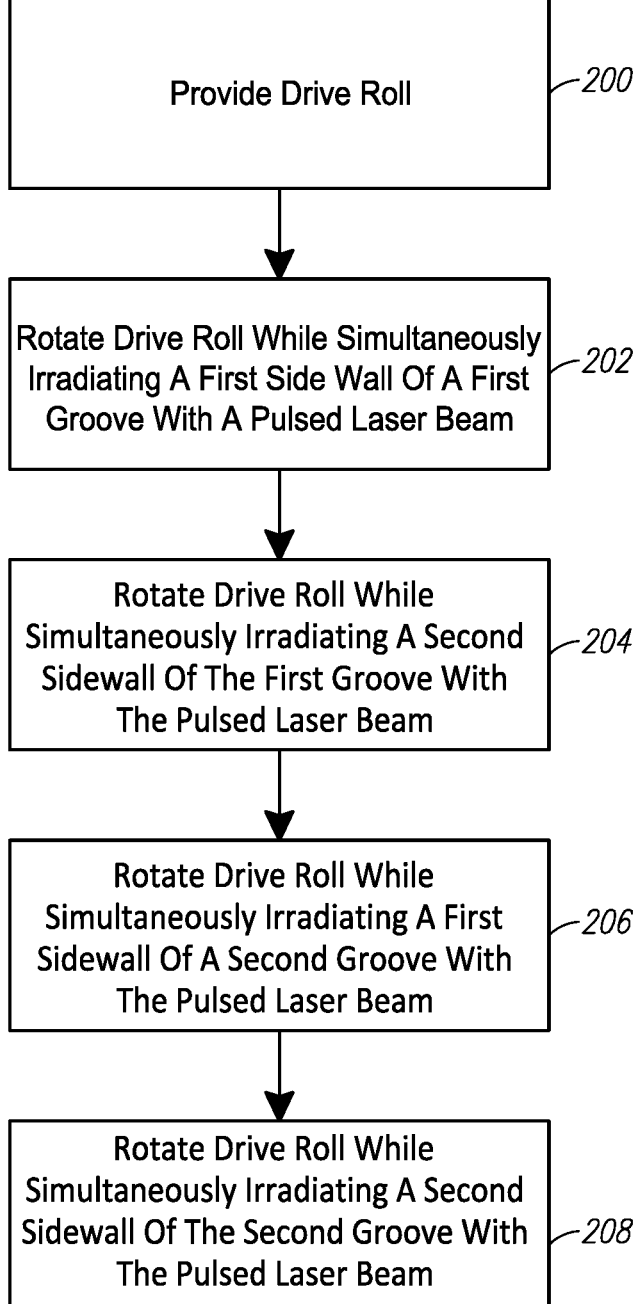
FIG. 8 is a flow diagram.

FIG. 8 is a flow diagram of an example method of surface finishing a welding wire drive roll. In step 200, a drive roll as discussed above is provided. The drive roll is rotated (e.g., one or more revolutions) while simultaneously irradiating a first sidewall of a first circumferential groove with a pulsed laser beam as discussed above (step 202). The drive roll is further rotated while simultaneously irradiating a second sidewall of the first circumferential groove with the pulsed laser beam (step 204). The drive roll is further rotated while simultaneously irradiating a first sidewall of a second circumferential groove with the pulsed laser beam (step 206). The drive roll is further rotated while simultaneously irradiating a second sidewall of the second circumferential groove with the pulsed laser beam (step 208). The surface finishing creates at least one ring of craters on each sidewall of the circumferential wire drive grooves.

A laser etching surface finishing process for welding wire drive rolls is discussed above. However other surface finishing processes could be employed in addition to or as an alternative to the laser etching process discussed above. For example, a thermal spray process could be used to bond a powder to the surface of the drive roll. Thermal spray processes include laser powder, plasma spray powder, HVOF (high-velocity oxygen fuel), or dual wire arc spray. The particle size of the powder can be controlled so the surface drives the welding wire properly with minimal marking and deformation of the wire to mitigate feeding problems.

Another surface finishing process for welding wire drive rolls is electroplating with embedded hard particles. An electroplating process is used to create a coated surface with embedded hard particles such as tungsten carbide or diamond. Common electroplating substrates are nickel or chrome. Embedded particle size may be controlled to minimize surface damage to the driven wire.

Another surface finishing process for welding wire drive rolls involves applying a hard coating to the surface of a soft drive roll.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding wire drive roll, comprising:
    an outer circumferential surface having a circumferential groove projecting radially inward from the outer circumferential surface, wherein the circumferential groove includes:
       a first sidewall having a first sidewall surface; and
       a second sidewall having a second sidewall surface;
       wherein the first sidewall surface includes a first surface finishing comprising a first ring of laser-formed craters along the first sidewall surface, and
       wherein the second sidewall surface includes a second surface finishing comprising a second ring of laser-formed craters along the second sidewall surface, and wherein respective crater diameters of the first ring of laser-formed craters and the second ring of laser-formed craters are in a range of 0.020 to 0.050 inches.

2. The welding wire drive roll of claim 1, wherein adjacent craters of the first ring of laser-formed craters overlap, and adjacent craters of the second ring of laser-formed craters overlap.

3. The welding wire drive roll of claim 1, wherein the first ring of laser-formed craters and the second ring of laser-formed craters are located at substantially a same radial distance from a central axis of the welding wire drive roll.

4. The welding wire drive roll of claim 1, wherein first ring of laser-formed craters is substantially centered along the first sidewall, and the second ring of laser-formed craters is substantially centered along the second sidewall.

5. The welding wire drive roll of claim 1, wherein the respective crater diameters of the first ring of laser-formed craters and the second ring of laser-formed craters are at least 50% of a width of the first sidewall and the second sidewall.

6. The welding wire drive roll of claim 1, further comprising a groove base extending between the first sidewall and the second sidewall, wherein the groove base is concave.

7. The welding wire drive roll of claim 1, wherein individual craters of the first ring of laser-formed craters include a central depression that is recessed into the first sidewall surface, and an outer peripheral portion that is raised above the first sidewall surface.

8. The welding wire drive roll of claim 7, wherein the outer peripheral portion is formed by material displaced from the central depression.

9. The welding wire drive roll of claim 1, wherein the outer circumferential surface has a second circumferential groove projecting radially inward from the outer circumferential surface, and wherein the second circumferential groove includes:
a third sidewall having a third sidewall surface; and
a fourth sidewall having a fourth sidewall surface;
wherein the third sidewall surface includes a third surface finishing comprising a third ring of laser-formed craters along the third sidewall surface, and
wherein the fourth sidewall surface includes a fourth surface finishing comprising a fourth ring of laser-formed craters along the fourth sidewall surface.

10. The welding wire drive roll of claim 9, wherein the first ring of laser-formed craters, the second ring of laser-formed craters, the third ring of laser-formed craters, and the fourth ring of laser-formed craters are located at substantially a same radial distance from a central axis of the welding wire drive roll.

11. A welding wire drive roll, comprising:
an outer circumferential surface having a first circumferential groove and a second circumferential groove axially-offset from the first circumferential groove, wherein both of the first circumferential groove and the second circumferential groove project radially inward from the outer circumferential surface, wherein the first circumferential groove includes:
a first sidewall having a first sidewall surface; and
a second sidewall having a second sidewall surface;
wherein the first sidewall surface includes a first surface finishing comprising a first plurality of laser-formed craters arrayed annularly along the first sidewall surface and having respective central depressions that are recessed into the first sidewall surface and outer peripheral portions that are raised above the first sidewall surface, and
wherein the second sidewall surface includes a second surface finishing comprising a second plurality of laser-formed craters arrayed annularly along the second sidewall surface and having respective central depressions that are recessed into the second sidewall surface and outer peripheral portions that are raised above the second sidewall surface, and
wherein the second circumferential groove includes:
a third sidewall having a third sidewall surface; and
a fourth sidewall having a fourth sidewall surface;
wherein the third sidewall surface includes a third surface finishing comprising a third plurality of laser-formed craters arrayed annularly along the third sidewall surface and having respective central depressions that are recessed into the third sidewall surface and outer peripheral portions that are raised above the third sidewall surface, and
wherein the fourth sidewall surface includes a fourth surface finishing comprising a fourth plurality of laser-formed craters arrayed annularly along the fourth sidewall surface and having respective central depressions that are recessed into the fourth sidewall surface and outer peripheral portions that are raised above the fourth sidewall surface,
wherein crater diameters of the first plurality of laser-formed craters, crater diameters of the second plurality of laser-formed craters, crater diameters of the third plurality of laser-formed craters, and crater diameters of the fourth plurality of laser-formed craters are in a range of 0.020 to 0.050 inches.

12. The welding wire drive roll of claim 11, wherein the first plurality of laser-formed craters, the second plurality of laser-formed craters, the third plurality of laser-formed craters, and the fourth plurality of laser-formed craters are located at substantially a same radial distance from a central axis of the welding wire drive roll.

13. The welding wire drive roll of claim 12, wherein adjacent craters in each annular array overlap.

14. The welding drive roll of claim 12, wherein:
the first plurality of laser-formed craters arrayed annularly along the first sidewall surface is substantially centered along the first sidewall,
the second plurality of laser-formed craters arrayed annularly along the second sidewall surface is substantially centered along the second sidewall,
the third plurality of laser-formed craters arrayed annularly along the third sidewall surface is substantially centered along the third sidewall, and
the fourth plurality of laser-formed craters arrayed annularly along the fourth sidewall surface is substantially centered along the fourth sidewall.

15. The welding drive roll of claim 11, wherein the crater diameters of the first plurality of laser-formed craters are at least 50% of a width of the first sidewall, the crater diameters of the second plurality of laser-formed craters are at least 50% of a width of the second sidewall, the crater diameters of the third plurality of laser-formed craters are at least 50% of a width of the third sidewall, and the crater diameters of the fourth plurality of laser-formed craters are at least 50% of a width of the fourth sidewall.

16. The welding wire drive roll of claim 11, wherein the first circumferential groove further includes a first concave groove base extending between the first sidewall and the second sidewall, and the second circumferential groove further includes a second concave groove base extending between the third sidewall and the fourth sidewall.

17. A welding wire drive roll, comprising:

an outer circumferential surface having a circumferential groove projecting radially inward from the outer circumferential surface, wherein the circumferential groove is formed by:

a first sidewall;

a second sidewall; and a groove base extending between the first sidewall and the second sidewall, wherein at least one of the first sidewall, the second sidewall, and the groove base includes a surface finishing comprising a ring of laser-formed craters along a surface of said at least one of the first sidewall, the second sidewall, and the groove base, wherein each crater has a diameter in a range of 0.020 to 0.050 inches.

18. A method of surface finishing a welding wire drive roll, comprising the steps of:

providing the welding wire drive roll, wherein the welding wire drive roll comprises an outer circumferential surface having a circumferential groove projecting radially inward from the outer circumferential surface, and wherein the circumferential groove is formed by a first sidewall having a first sidewall surface, a second sidewall having a second sidewall surface, and a groove base extending between the first sidewall and the second sidewall; and rotating the welding wire drive roll while simultaneously irradiating the first sidewall with a pulsed laser beam thereby creating a first ring of craters along the first sidewall surface, wherein each crater has a diameter that is in a range of 0.020 to 0.050 inches and is at least 50% of a width of the first sidewall.

19. The method of claim 18, wherein individual craters of the first ring of craters include a central depression that is recessed into the first sidewall surface, and an outer peripheral portion that is raised above the first sidewall surface, and wherein the outer peripheral portion is formed by material displaced from the central depression.

20. The method of claim 18, further comprising the step of rotating the welding wire drive roll while simultaneously irradiating the second sidewall with the pulsed laser beam thereby creating a second ring of craters along the second sidewall surface.

21. The method of claim 20, wherein the first ring of craters and the second ring of craters are located at substantially a same radial distance from a central axis of the welding wire drive roll.

22. The method of claim 21, wherein adjacent craters of the first ring craters overlap, and adjacent craters of the second ring of craters overlap.

* * * * *